Nov. 20, 1951  A. J. HORNFECK  2,575,494
SPEED MEASURING MECHANISM
Filed Nov. 9, 1948  2 SHEETS—SHEET 1

INVENTOR.
ANTHONY J. HORNFECK
BY
Raymond W. Jenkins
ATTORNEY

Patented Nov. 20, 1951

2,575,494

UNITED STATES PATENT OFFICE 2,575,494

SPEED MEASURING MECHANISM

Anthony J. Hornfeck, Lyndhurst, Ohio, assignor to Bailey Meter Company, a corporation of Delaware Application November 9, 1948, Serial No. 59,067

9 Claims. (Cl. 175—183)

This invention relates to mechanisms for measuring speed, and more particularly to mechanisms that are adapted especially for measuring very low speeds of rotation or reciprocation.

It is sometimes necessary that apparatus be provided for measuring accurately a rotating speed as low as 2 R. P. M. and for detecting changes in speed in the order of a few hundredths of 1 R. P. M. Most tachometer generators are not satisfactory below ranges of about 100 R. P. M., and none of the commercial speed measuring devices known are suitable for the measurement of very low speeds.

It has been found that such speeds may be measured by subjecting a balanceable network to the difference between a known voltage and a voltage which is proportional to the speed. Any slight difference between the voltages may be made to unbalance the network and cause an operation of a motor for adjusting the known voltage to effect a rebalance. An indicating or recording mechanism may be positioned simultaneously by the motor to permit a reading of the speed measured. The voltage proportional to the speed may be obtained by moving a contact along an energized slidewire in direct proportion to the speed and connecting the contact and one end of the slidewire in a circuit including a condenser and a resistance in series. When the slidewire is energized by direct current, the flow of current through the condenser is directly proportional to the rate of change of the voltage applied to the circuit in which it is connected. Since this rate of voltage change is proportional to the speed measured, the current passing through the condenser must also be proportional to the speed. This same current passing through the resistance in the circuit produces a voltage drop in the latter proportional to the speed, and the voltage across the resistance is opposed to the known voltage. In order to obtain a continuous measurement of speed in one direction, a plurality of contacts moving over slidewires out of phase with each other may be employed, and a switch mechanism may be provided for connecting the resistances of the separate slidewire circuits selectively in opposition to the known voltage. A continuous measurement of a reciprocating motion may be obtained by moving a single contact over a slidewire in proportion to the speed measured.

An object of my invention is to provide an improved mechanism for measuring very low speeds. Another object is to provide an improved apparatus for measuring rotating or bodily movements of an object. Yet another object is to provide an apparatus for producing a voltage proportional to the speed to be measured, applying the voltage produced in opposition to an adjustable voltage, and unbalancing a network in proportion to the difference between the voltages for effecting operation of a motor to adjust the adjustable voltage so as to rebalance the network. Other objects will appear in the course of the following description.

In the accompanying drawings there are shown for purposes of illustration two forms which my invention may assume in practice.

Figure 1:
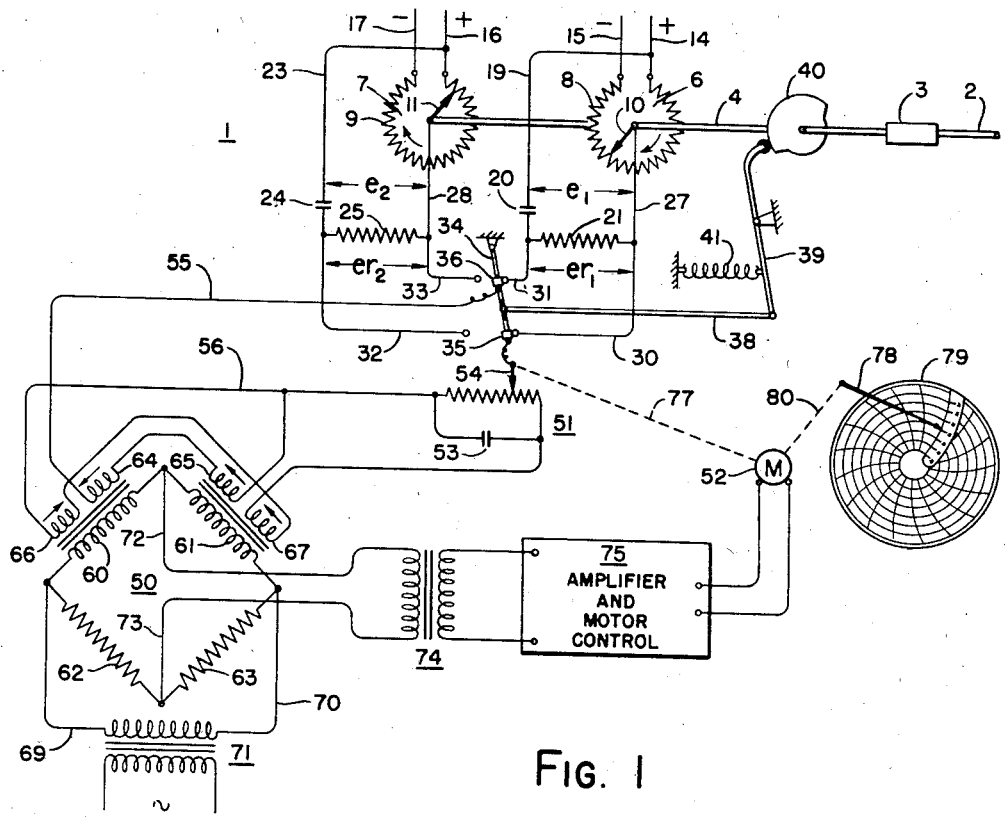
Fig. 1 is a schematic diagram of my improved apparatus arranged for measuring a rotating speed.

Referring to Fig. 1 it will be noted that my improved apparatus, generally designated 1, is arranged for measuring the speed of a rotating shaft 2. Connected to the shaft 2 by a suitable coupling 3 s a shaft 4 which may be rotatably supported by any suitable means, not shown. The shaft 4 extends axially through members 6 and 7 carrying slidewires 8 and 9 adapted to be engaged by contacts 10 and 11 operatively connected to the shaft 4. The members 6 and 7 are made of an insulating material and are supported in fixed positions by suitable means, not shown. The shaft 4 may, if desired, be made of an insulating material, or it may be made of a conducting material and be insulated from the contacts 10 and 11 by suitable means. The ends of the slidewires 8 and 9 are connected, respectively, by conductors 14, 15, and 16, 17 to some constant D.-C. source. Assuming that the contacts 10 and 11 are being driven with the shaft 4 in a clockwise direction, then the end of the slidewire 8 connected to the conductor 14 is also connected by a conductor 19 through a condenser 20 to one end of a resistance 21, and the end of the slidewire 9 connected to the conductor 16 is also connected by a conductor 23 through a condenser 24 to one end of a resistance 25. The contacts 10 and 11 are connected, respectively, by conductors 27 and 28 to the other ends of the resistances 21 and 25.

Figure 2:
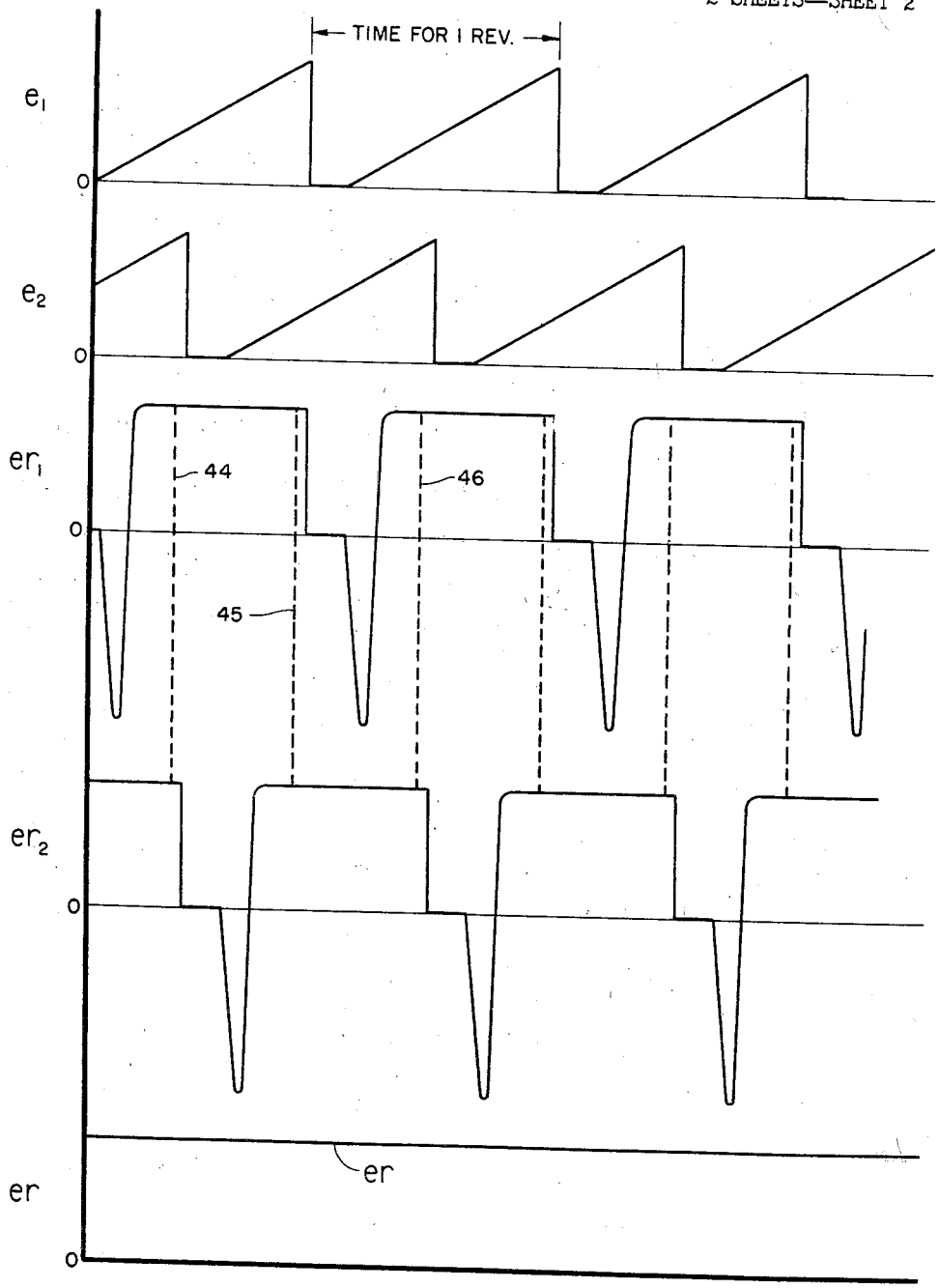
Fig. 2 is a series of curves showing the voltage changes across different portions of the apparatus of Fig. 1.

The contacts 10 and 11 are connected to the shaft 4 so that they are 180° out of phase with each other. As the contacts move over their respective slidewires they subject the circuits including the condensers 20 and 24 to voltages which increase directly in proportion to the speed of the shaft. As shown in Fig. 2, the voltage $e_1$ applied from the slidewire 8 across the conductors 19 and 27 increases from zero to a maximum value as the contact moves from one end of the slidewire to the other. As soon as the contact 10 moves out of engagement with the slidewire 8 the voltage $e_1$ drops to zero and remains there until the contact 10 is again moved onto the slidewire 8. The voltage $e_2$ applied from the slidewire 9 across the conductors 23 and 28 varies in the same manner but is 180° out of phase with the voltage $e_1$.

The current flowing through the condensers 20 and 24 as a result of the varying voltages $e_1$ and $e_2$ is directly proportional to the speed of the slidewire contacts and, since the contacts are connected for rotation with the shaft 4, to the speed of the shaft. Considering the circuit connected to the slidewire 8 and representing the condenser 20 by C and the resistance 21 by R, then the differential equation for this circuit is $$e_1 = \frac{1}{C}\int i\, dt + iR \quad (1)$$

or $$\frac{de_1}{dt} = \frac{i}{C} + \frac{R\, di}{dt} \quad (2)$$

This assumes that the slidewire resistance is small. Now $e_1 = E\theta$ where

E is the voltage across the slidewire and $\theta$ is the per unit motion of the slidewire contact. Hence $$\frac{de_1}{dt} = E\frac{d\theta}{dt}$$

$\frac{d\theta}{dt} = w$ (rotational velocity of the slidewire contract)

Therefore $$\frac{de_1}{dt} = Ew$$

Substituting for $e_1$ in equation 2 gives $$Ew = \frac{i}{C} + \frac{R\, di}{dt} \quad (3)$$

The solution of equation 3 gives $$i = ECw\left(1 - e^{\frac{-t}{RC}}\right) \quad (4)$$

if R is small $$i = ECw \quad (5)$$

since E and C are constant, the current $(i)$ through the condenser C and the resistance R is directly proportional to $(w)$ the speed of the slidewire contact and of the shaft.

The voltage $(er_1)$ across the resistance R is $er_1 = iR$
$= (ECR)w$
$= (Et_0)w$ (where $t_0$ = time constant of the circuit)

Assuming that the speed of the shaft is only 1 R. P. M. and that E=100 volts, R=1000 ohms and C=100 micro-farads, then $$t_0 = (100 \times 1000 \times 10^{-6}) = .1 \text{ second}$$

$$w = \frac{1}{60}$$

and $$er_1 = 100 \times .1 \times \frac{1}{60} = .166 \text{ volt}$$

The voltage $er_2$ across the resistance 25 in the circuit connected to the slidewire 9 is equal to the voltage $er_1$ across the resistance 21. As shown in Fig. 1 the ends of the resistances 21 and 25 are connected respectively by conductors 30, 31 and 32, 33 to contacts of a double pole-double throw switch which may be of any commercial type that is adapted to operate with a snap action from one circuit closing position to the other. This switch is shown herein as including a pivotally mounted switch arm 34 carrying contacts 35 and 36 insulated from each other and adapted to engage either the contacts connected to the conductors 30, 31 or those connected to the conductors 32, 33. The switch arm is shown connected by a member 38 to one end of a pivotally mounted cam follower 39 cooperating with a cam 40 fixed to the shaft 4. A spring 41 is connected to the cam follower for holding the latter in yielding engagement with the cam. The shape of the cam is such as to hold the switch arm contacts in engagement with the contacts connected to the conductors 30, 31 until the slidewire contact 10 reaches a position near the end of the slidewire. The switch arm is then thrown quickly to a position engaging the contacts 35, 36 with the contacts connected to the conductors 32, 33. Since the slidewire contact 11 lags the contact 10 by 180°, the voltage $e_2$ continues to build up and energize the conductors 32 and 33 after the contact 10 passes beyond the end of the slidewire 8.

The voltages $er_1$ and $er_2$ across the resistances 21 and 25 are shown in Fig. 2. As long as the voltage $e_1$ is increased at a uniform rate by movement of the contact 10, the current flow through the condenser 20 remains constant as shown by the above equations. This current multiplied by the resistance 21 gives a constant voltage drop $er_1$. As soon as the contact 10 moves beyond the end of the slidewire to a position where the circuit through the condenser is broken, the current flow through the condenser stops and the voltage $er_1$ drops to zero. When the contact 10 first engages the slidewire again, the condenser circuit is shorted and the condenser discharges to produce a large negative voltage across the resistance 21. As the contact 10 moves along the slidewire to increase the voltage $e_1$, the condenser is recharged and the current flow through it soon reaches a constant value. Referring to the curves of Fig. 2 for the voltages $er_1$ and $er_2$, it will be noted that a broken line 44 indicates the point at which the switch arm 34 is thrown to subject the contacts 35, 36 to the voltage $er_1$. Just before the slidewire contact 10 reaches the end of the slidewire, the switch arm is thrown again, as indicated by the broken line 45, to subject the contacts 35, 36 to the voltage $er_2$. As the slidewire contact 11 approaches the end of the slidewire 9 the switch arm is thrown, as indicated by the broken line 46, to subject the contacts 35, 36 to the voltage $er_1$ again. It will be appreciated that the voltage $er$ across the contacts 35, 36, as indicated by Fig. 2 is always at a constant value as long as the speed of the shaft 4 remains constant.

To obtain an operation which gives an indication of shaft speed there is provided a balanceable bridge 50 operating in response to the difference between the voltages from an adjustable potentiometer 51 and the contacts 35, 36 for effecting operation of a motor 52 to adjust the potentiometer until the network is rebalanced. As shown herein the potentiometer 51 is energized by a constant D.-C. supply, as by a battery 53, and has an adjustable contact 54 connected to the contact 35 on the switch arm. Conductors 55 and 56 are connected to the switch contact 36 and to one end of the potentiometer respectively and form a portion of the input circuit for the balanceable network 50. The connection to the potentiometer is such that the voltage drop across its portion included in the circuit opposes the voltage across the contacts 35, 36.

The bridge network 50 includes impedance windings 60 and 61 of reactor converters forming one pair of its legs, and fixed resistances 62 and 63 forming the other pair of legs. Input windings 64 and 65 of the converters are connected in series in a circuit including the conductors 55 and 56, and bias windings 66 and 67 are connected in series across the battery 53 in such a way that one opposes one of the input windings while the other aids the other input winding in determining the reactance of the impedance windings 60 and 61. The diagonally opposite points of the bridge between the pairs of legs are connected by conductors 69 and 70 to the secondary winding of a transformer 71 having its primary winding energized from a source of alternating current. The diagonally opposite points between the legs of each pair are connected by conductors 72 and 73 to the terminals of the primary winding of a transformer 74. The secondary winding of the transformer 74 is connected to an amplifier and motor control device 75.

The bridge circuit 50 and the amplifier and motor control device may be like those disclosed in the Hornfeck Patent 2,447,338, and further description of the same herein is believed to be unnecessary. It is sufficient to say that a low level direct current of given polarity supplied to the input windings 64, 65 through the conductors 55, 56 results in the supply of a greatly amplified A.-C. signal of given phase from the bridge to the amplifier and motor control device, and the motor 52 is energized to effect its operation in one direction. If the current supplied by the conductors 55, 56 to the input windings 64, 65 is reversed in polarity, the bridge becomes unbalanced so as to energize the amplifier and motor control device at a reversed phase for effecting an operation of the motor in the opposite direction. Suitable connections 77 between the motor and the contact 54 of the potentiometer are provided so that the operation of the motor adjusts the contact to make the voltage from the potentiometer equal that across the contacts 35, 36. As shown above with the values assumed for the different constants of the circuit, the voltage across the contacts 35, 36 is .166 volt at a speed of 1 R. P. M. An increase in the speed to 2 R. P. M. results in an increase in the voltage between the contacts to .333 volt. A small fraction of the difference between the two voltages is sufficient to unbalance the bridge circuit and effect an operation of the motor. The extent of motor operation obtained on a predetermined unbalance may be adjusted to any desired amount by changing the drive connection 77 between the motor and the potentiometer contact. For indicating or recording the speed of rotation there is provided an arm 78 cooperating with a scale or chart 79 and driven by the motor 52 through suitable connections 80.

Figure 3:
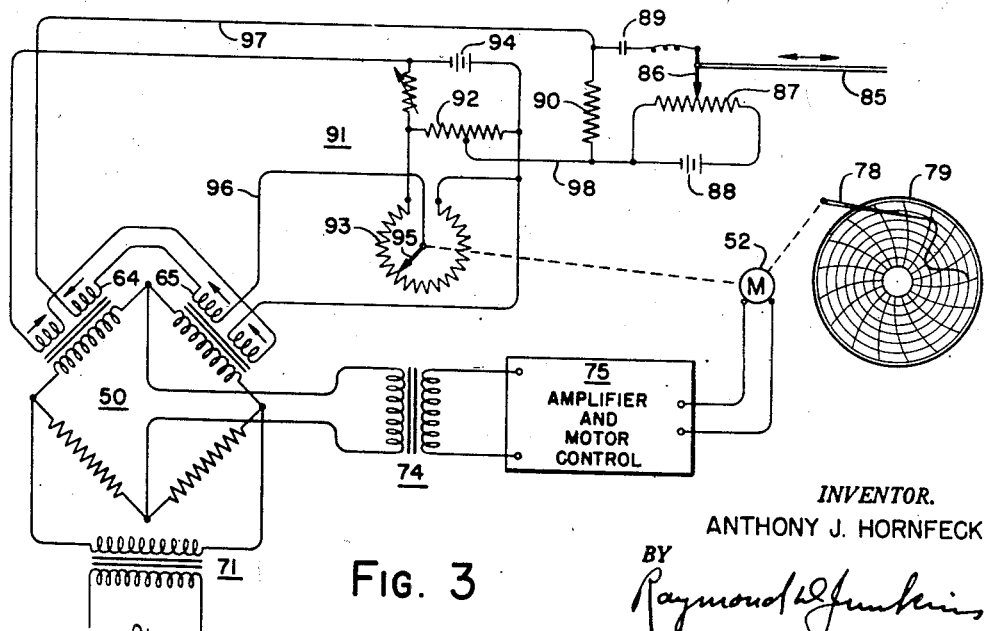
Fig. 3 is a schematic diagram showng my improved apparatus arranged for measuring the speed of a reciprocating member.

In Fig. 3 there is shown an arrangement of my apparatus for measuring continuously the speed of a reciprocating member 85. An adjustable contact 86 of a slidewire 87 is connected to the member 85 in such a manner that it is moved between the ends of the slidewire by reciprocations of the member. The slidewire is energized from a constant D.-C. source, such as a battery 88. The contact 86 and one end of the slidewire are connected to the ends of a series circuit including a condenser 89 and a resistance 90. With the connections as shown, a movement of the contact 86 to the right increases the voltage applied to the series circuit and causes current to flow through the condenser 89 and the resistance 90 at a rate which increases in proportion to the rate of voltage increase. Movement of the contact to the left results in a decrease in the voltage and a flow of current in the opposite direction by reason of the discharging of the condenser. The rate of condenser discharge is proportional to the rate of decrease in the potential from the slidewire, and the current flow through the resistance 90 is proportional to the rate of condenser discharge. A potentiometer circuit 91 comprising resistances 92 and 93 connected in parallel and energized from a battery 94 is provided for establishing a potential to oppose the voltage drop across the resistance 90 in an input circuit to a bridge 50 like that of Fig. 1. An adjustable contact 95 for the resistance 93 is connected by a conductor 96 to the input winding 65, and one end of the resistance 90 is connected by a conductor 97 to the input winding 64. The other end of the resistance 90 is connected by a conductor 98 to the mid-point of the resistance 92.

As the slidewire contact 86 is moved in one direction by the member 85, the voltage across the resistance 90 is proportional to the speed of movement and is of a given polarity. This effects an unbalance of the bridge and an operation of the motor to position the contact 95 in a direction to produce a voltage across the potentiometer circuit opposing the voltage across the resistance 90 in the input circuit to the bridge. When the direction of movement by the member 85 reverses, the polarity of the voltage across the resistance 90 also reverses but remains proportional to the speed. The bridge 50 is now unbalanced to effect an operation of the motor in the opposite direction to move the contact 95 past its center position to a point where the voltage across the potentiometer circuit opposes again the voltage across the resistance 90. It will be appreciated that the indicating or recording arm 79 will be moved in this case to one side or another of a zero line depending upon the direction of movement by the reciprocating member 85. The distance that the arm is positioned from the zero line is directly proportional to the speed regardless of the direction of movement. The direction in which the indicator is moved from the zero line provides an indication of the direction of reciprocating movement.

While there are shown and described in this application two forms which my invention may assume in practice, it will be understood that the invention may be modified and embodied in various other forms without departing from its spirit or the scope of the appended claims.

What I claim as new and desire to secure by Letters Patent of the United States, is:

1. A speed measuring mechanism comprising, in combination, a potentiometer type slidewire constantly energized from a source of direct current and having a movable contact, means for moving said contact along said slidewire at a rate proportional to the speed to be measured, a condenser and a fixed resistance alone connected in a series circuit to said contact and to one end of said slidewire and means for measuring the potential developed across said resistance, said means being graduated in speed units.

2. A speed measuring mechanism comprising, in combination, a plurality of slidewires, each energized from a source of direct current and having a movable contact, means for moving said contacts consecutively along said slidewires at a rate proportional to the speed to be measured, a series circuit connected to one end of each of said slidewires and to the contact therefore, a condenser and a fixed resistance connected in each of said series circuits, voltage measuring means, and means for connecting said fixed resistances selectively to said voltage measuring means.

3. A speed measuring mechanism comprising, in combination, a plurality of slidewires, each energized from a source of direct current and having a movable contact, means for moving each of said contacts along its slidewire from one end to the other and then out of engagement therewith to the first end again at a rate proportional to the speed to be measured, said contacts being connected for movement out of phase with each other, a series circuit connected to one end of each of said slidewires and to the contact therefor, a condenser and a fixed resistance connected in each of said series circuits, voltage measuring means, means including a switch for connecting said measuring means selectively to said fixed resistances, said switch operating to switch said measuring means quickly from one resistance to the other, and means for actuating said switch to break the connection to each resistance before the contact controlling the circuit is moved out of engagement with its slidewire and to complete a connection to another resistance in which the contact controlling the circuit thereof has moved into engagement with its slidewire.

4. The mechanism of claim 3 in which said switch is movable to a plurality of different positions and is operative in each position to connect said measuring means to a different one of said fixed resistances, and in which said means for actuating said switch comprises a cam, and means for driving said cam at the speed to be measured.

5. A speed measuring mechanism comprising, in combination, a plurality of slidewires, means for subjecting said slidewires to a continuous D.-C. voltage, contacts engageable with said slidewires, means for effecting relative movement between said slidewires and their contacts so that their points of engagement travel consecutively along the slidewires from one end to the other out of phase with each other and at a speed proportional to the speed to be measured, series circuits, one connected to an end of each slidewire and to the contact therefor, a condenser and a fixed resistance connected in each of said series circuits, means for measuring a D.-C. voltage, and means for connecting said measuring means alternately to said fixed resistances.

6. A mechanism for measuring a continuous rotating speed comprising, in combination, a plurality of slidewires, each curved longitudinally to the shape of a circle and having its ends spaced apart, means for supporting said slidewires in fixed positions, means for subjecting said slidewires individually to a continuous D.-C. voltage, contacts engageable with said slidewires at points spaced angularly from each other, means for swinging said contacts so that they move over their slidewires consecutively in one direction, series circuits, one connected to an end of each slidewire and to the contact therefor, a condenser and a fixed resistance connected in each of said series circuits, means for measuring a D.-C. voltage, and means for connecting said adjustable means successively to said fixed resistances and only during the time of engagement of the contact therewith.

7. A mechanism for measuring the speed of a rotating shaft comprising, in combination, a plurality of circular slidewires each forming an open ring, means for subjecting each slidewire across said opening to a continuous D.-C. voltage, means for supporting said slidewires in fixed positions, an elongated member operatively connected to said shaft for rotation therewith and extending axially relative to said slidewires, contact arms connected to said elongated member and engageable with said slidewires at points spaced at different angularities relative to said openings, series circuits, one connected to an end of each slidewire and to the contact therefor, a similar condenser and a similar fixed resistance connected in each of said series circuits, means for measuring a D.-C. voltage, a switch mechanism for connecting said measuring means consecutively to the fixed resistances each while the contact is moving remote from the opening and means operated from said rotating shaft for actuating said switch mechanism.

8. The mechanism of claim 7 in which said actuating means for said switch mechanism comprises a cam fixed to said elongated member for rotation therewith.

9. A source of direct current whose potential is indicative of speed comprising in combination, a potentiometer having a slidewire, a constant potential direct current energizing said potentiometer slidewire from end to end, a slider for said potentiometer, means to actuate said slider in keeping with the speed to be measured, a fixed condenser and a fixed resistance connected in series, said series alone being connected to one end of said potentiometer and to said slider and an output circuit connected to the two ends of said fixed resistance for association with a potential measuring means graduated in speed.

ANTHONY J. HORNFECK.

REFERENCES CITED

The following references are of record in the file of this patent:

UNITED STATES PATENTS

| Number | Name | Date |
|---|---|---|
| 2,331,934 | Satterlee | Oct. 19, 1943 |
| 2,401,168 | Kronenberger | May 28, 1946 |
| 2,415,492 | Hines | Feb. 11, 1947 |
| 2,447,338 | Hornfeck | Aug. 17, 1948 |